US012196004B2

(12) United States Patent
Zhang

(10) Patent No.: US 12,196,004 B2
(45) Date of Patent: Jan. 14, 2025

(54) SMART DOOR LOCK

(71) Applicant: Nanjing Easthouse Electrical Co., Ltd., Jiangsu (CN)

(72) Inventor: Yue Zhang, Nanjing (CN)

(73) Assignee: Nanjing Easthouse Electrical Co., Ltd., Nanjing (CN)

( * ) Notice: Subject to any disclaimer, the term of this patent is extended or adjusted under 35 U.S.C. 154(b) by 171 days.

(21) Appl. No.: 18/074,541

(22) Filed: Dec. 5, 2022

(65) Prior Publication Data

US 2023/0094965 A1 Mar. 30, 2023

Related U.S. Application Data

(63) Continuation of application No. PCT/CN2020/116608, filed on Sep. 21, 2020.

(30) Foreign Application Priority Data

Jun. 8, 2020 (CN) ......................... 202010511306.9

(51) Int. Cl.
*E05B 49/00* (2006.01)
*E05B 17/20* (2006.01)

(52) U.S. Cl.
CPC ............ *E05B 49/002* (2013.01); *E05B 17/20* (2013.01)

(58) Field of Classification Search
CPC ...... E05B 49/00; E05B 49/002; E05B 49/004; E05B 17/00; E05B 17/20; E05B 15/08; E05B 77/00; E05B 77/283
USPC ............................................................ 70/277
See application file for complete search history.

(56) References Cited

U.S. PATENT DOCUMENTS 6,669,250 B1 * 12/2003 St. Louis .............. E05C 19/022 292/73
7,099,474 B1 * 8/2006 Liden ................. G07C 9/00309 235/382
10,629,015 B1 4/2020 Burge et al.
2009/0091421 A1 * 4/2009 Hirano .................... B60R 11/00 340/5.7
2020/0048931 A1 * 2/2020 Yang ....................... E05B 67/22

FOREIGN PATENT DOCUMENTS

CA 2249802 A1 4/2000
CN 101386290 A 3/2009
CN 101683840 A 3/2010
CN 101908717 A 12/2010
CN 111179481 A 5/2020
CN 212716220 U 3/2021
(Continued)

OTHER PUBLICATIONS

EP 3 506 216: Cazalis et al. (Year: 2019).*
(Continued)

*Primary Examiner* — Nathan Cumar
(74) *Attorney, Agent, or Firm* — W&G Law Group

(57) ABSTRACT

A smart door lock may include latch mechanism for locking and unlocking doors; authorization module for authorizing or de-authorizing authority of mechanical key for opening latch mechanism; the mechanical key for inserting into the latch mechanism for unlocking after authorized by the authorization module. Thanks to the structure of smart door lock, there is no need to carry the mechanical key all the time.

8 Claims, 4 Drawing Sheets

(56) References Cited

FOREIGN PATENT DOCUMENTS

| | | | |
|---|---|---|---|
| EP | 3506215 | A1 | 7/2019 |
| WO | 9715739 | A3 | 9/1997 |

OTHER PUBLICATIONS

EP 3 505 710: Fauvel et al. (Year: 2019).*
First Office Action(CN202010511306.9); Date of Mailing: Aug. 24, 2023.
International Search Report (PCT/CN2020/116608); Date of Mailing: Mar. 9, 2021.
Notice of Allowance(CN202010511306.9); Date of Mailing: Oct. 18, 2023.

* cited by examiner

SMART DOOR LOCK

CROSS-REFERENCE TO RELATED APPLICATIONS

The present application is a continuation of Intentional Application No. PCT/CN2020/116608, filed on Sep. 21, 2020, which claims priority to Chinese Patent Application No. 202010511306.9, filed on Jun. 8, 2020, the contents of which are incorporated herein by reference in their entireties.

TECHNICAL FIELD

The present disclosure relates to the field of security technologies and, in particular, to a smart door lock.

BACKGROUND

With the development of Internet of Things technology, smart home gradually into people's daily life. Smart appliances, intelligent monitoring, intelligent elevators, smart door locks and other applications are increasingly widespread.

It is well known in the home industry, the smart door lock can be installed with a battery to provide energy for the control signal processing of the smart door lock and the locking and unlocking of the smart door lock mechanical structure.

In practice, there are situations where the user may not operate the smart door lock for a long time, for example, during long-term travel. At this point, the electrical energy of the smart door lock may have run out, so that the control signal of the smart door lock cannot be processed or the mechanical structure of the smart door lock cannot be operated.

When facing such an emergency, a solution is proposed by providing a charging interface through which the smart door lock can be charged and energy restored.

Another solution is to provide a mechanical key so that the user can open the smart door lock through the mechanical key.

In implementing existing technologies, inventors found the following technical problems:

for a solution that provides a charging interface, the user is required to carry the charging cable and backup power supply, such as mobile phone, mobile power supply, etc. that can charge the smart door lock or device. Also, one end of the charging cable needs to match the charging connector of the smart door lock and the other end needs to match the transmission connector of the phone or mobile power supply. In these structures, the solution is ineffective as long as one of them cannot match.

For a solution that provides a mechanical key, the user is required to carry the mechanical key with him. The user's mechanical key can be carried with him or placed in office, car and other locations. In most cases, mechanical keys are placed in other locations such as offices, cars, etc. In the event that the electrical means cannot be opened, the user needs to go back and forth to the place where the mechanical key is placed to pick up the mechanical key, or wait for the user carrying the mechanical key to come to handle it.

Therefore, a smart door lock emergency solution that can be simple and timesaving needs to be provided.

SUMMARY

An embodiment of the present disclosure provides a simple and timely smart door lock emergency scheme to solve the technical problems of complex smart door lock emergency plan in the related art.

According to one embodiment of the present disclosure, a smart door lock may include: latch mechanism for locking and unlocking doors; authorization module for authorizing or de-authorizing authority of mechanical key for opening latch mechanism; the mechanical key for inserting into the latch mechanism for unlocking after authorized by the authorization module.

According to one embodiment of the present disclosure, the authorization module includes a first block; when the mechanical key is authorized, the first block withdraws, the mechanical key can be operated; when the mechanical key is not authorized, the first block prevents the mechanical key from moving.

According to yet another embodiment of the present disclosure, the authorization module includes moving member; when the mechanical key is authorized, the moving part is out of the limit state of the latch mechanism, and movement of the mechanical key can unlock the latch mechanism; when the mechanical key is not authorized, the moving member remain in the limit state of the latch mechanism and movement of the mechanical key does not unlock the latch mechanism.

According to yet another embodiment of the present disclosure, the mechanical key can achieve detachable limit.

According to yet another embodiment of the present disclosure, the smart door lock is provided with a receiving slot.

According to yet another embodiment of the present disclosure, the mechanical key may slip relative to the receiving slot or the mechanical key may be removed directly from the receiving slot.

According to yet another embodiment of the present disclosure, the smart door lock is provided with a mechanical key ejection mechanism.

According to yet another embodiment of the present disclosure, the ejection mechanism is a two-stroke motion mechanism, the mechanical key is limited after a first press, the mechanical key is ejected after a second press.

According to yet another embodiment of the present disclosure, the mechanical key is provided with a mechanical key receiving box; the ejection mechanism abuts against the receiving box.

According to yet another embodiment of the present disclosure, the authorization module has a second block; the second block receiving box the ejection mechanism; when the mechanical key is authorized, the second blocker withdraws and the mechanical key is ejected after a second press; when the mechanical key is not authorized, the second blocker limit prevents the ejection mechanism from ejecting the mechanical key.

According to yet another embodiment of the present disclosure, the mechanical key is embedded inside the smart door lock; when the mechanical key is authorized, the mechanical key is inserted into the latch mechanism; when the mechanical key is not authorized, the mechanical key is detached from the latch mechanism.

According to yet another embodiment of the present disclosure, the authorization method of the authorization module includes at least one of: entering the password; biometric matching; electronic labels; communications certification; or command action.

According to yet another embodiment of the present disclosure, a smart door lock includes: latch mechanism for locking and unlocking doors; mechanical key for inserting into the latch mechanisms for unlocking; receiving slot for receiving the mechanical key.

The examples provided in the present disclosure have at least the following beneficial effects:

The mechanical keys rely on smart door lock storage, and is no longer necessarily carried by the user, which can facilitate user use.

BRIEF DESCRIPTION OF DRAWINGS

The drawing described here is intended to provide a further understanding of the present disclosure and form part of the present disclosure, and the indicative implementing examples and descriptions of the present disclosure are used to interpret the present disclosure and do not constitute limitations of the present disclosure. In the drawing.

DESCRIPTION OF EMBODIMENTS

In order to make the purpose, technical scheme and advantages of the present disclosure more clear, the technical solution of the present disclosure will be described clearly and completely in the light of the specific implementations of the present disclosure and the corresponding drawings.

It is appreciated that, the examples described are only part of the implementation of the present disclosure, not all of them. Based on the implementing examples in the present disclosure, all other examples obtained by ordinary technical person in the field without making creative effort are within the scope of protection of the present disclosure.

Figure 1:
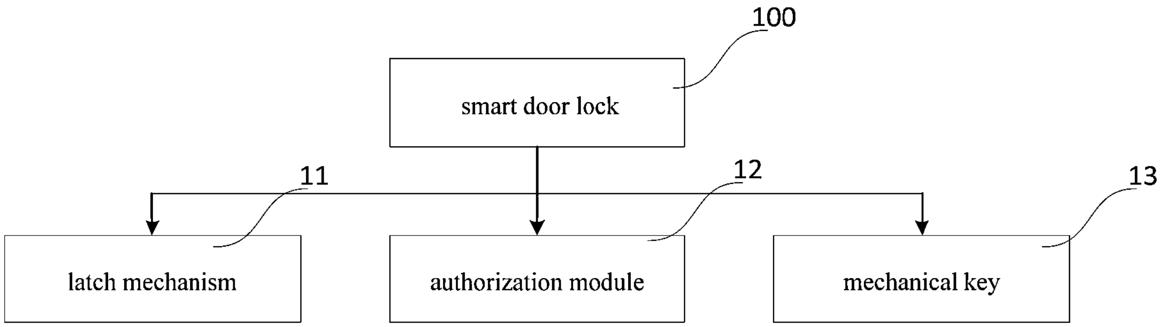
FIG. 1 shows a schematic structural view of a smart door lock according to embodiments of the present disclosure.

Now referring to FIG. 1, which shows a schematic structural view of a smart door lock 100. Smart door lock 100 includes latch mechanism 11, authorization module 12, mechanical key 13. In specific applications, smart door lock 100 has a variety of implementation forms, such as fingerprint door lock, finger vein door lock, sound door lock, iris door lock and so on. These smart door locks 100 associate the user's biometrics with the user's permissions.

The latch mechanism 11 is used for locking and unlocking the door. In specific applications, latch mechanism 11 can have different forms. In a specific application where a single door is mated to a door frame, the latch mechanism 11 can be installed on a single door. The latch mechanism 11 includes a movable tab. The door frame includes a positioning slot for the locking tongue. The tongue is inserted into the positioning slot to form the locking state of the latch mechanism 11. The tongue withdraws from the positioning slot, forming the unlocked state of the latch mechanism 11.

It is appreciated that, in another alternative implementation, the locking tongue can be inserted into the positioning slot, there is a stopper to prevent the lock tongue from abscessing, forming a latch mechanism 11 locking state. The stopper withdraws, allowing the lock tongue to reset, forming an unlocked state of the latch mechanism 11.

In a specific application of a double door, the latch mechanism 11 is installed on one door and the other door sets the mating structure of the latch mechanism 11. The latch mechanism 11 operates based on the same principle as the application of single door and door frame mating, and is not repeated here. It is understandable that the specific form of implementation of latch mechanism 11 should not be understood as a substantial limitation on the scope of protection of the present disclosure. The simple deformation of the latch mechanism 11 still falls under the protection of the present disclosure.

The motor-driven tab can be inserted into the positioning slot or withdrawn from the positioning slot. Alternatively, the electrical drive stopper can also be set to limit the tab to prevent the tab from withdrawing from the positioning slot, and the drive stopper withdraws to allow the tab to withdraw from the positioning slot.

The motor can be controlled by a control signal. The motor rotates under the control of the control signal to drive the tongue movement or the drive stopper motion, or other moving member of the drive latch mechanism 11.

Authorization module 12 is used to authorize or deauthorize the authority of the mechanical key 13 opening latch mechanism 11.

Further, in a preferred embodiment provided in the present disclosure, the authorization method of module 12 includes at least one of: entering the password; biometric matching; electronic labels; communications certification; or command action.

The smart door lock 100 can set a digital button or a digital dial. The user can complete the authorization of the mechanical key 13 by entering the correct password. The user can enter biometrics to complete the authorization of the mechanical key 13. For example, fingerprint door lock, finger vein door lock, sound door lock, iris door lock, facial recognition, etc. The user can also complete the authorization of the mechanical key 13 through the electronic label. Electronic tags can be magnetic cards, NFC cards, or NFC chips for mobile phones. Users can also complete the authorization of the mechanical key 13 through communication certification. Communication authentication can be wireless communication mode instructions, bluetooth pairing, QR code recognition, app authorization instructions, authorization instructions of legal terminal. The user can also complete the authorization of the mechanical key 13 by instructing the action. The command action can be the Morse code corresponding to the length of the press action.

Further, in one of the implementation methods provided in the present disclosure, the mechanical key 13 is embedded inside the smart door lock 100 (see FIG. 5); when the mechanical key 13 is authorized, the mechanical key 13 is inserted into the latch mechanism 11; when the mechanical key 13 is not authorized, the mechanical key 13 is separated from the latch mechanism 11.

In the implementation provided in the present disclosure, in order to reduce the burden of the user carrying a mechanical key 13, the mechanical key 13 is implanted inside the smart door lock 100. In addition, the mechanical key 13 directly implanted into the smart door lock 100 internal, by the internal structure directly realize the mechanical key 13 insertion and pull out, but also reduce the burden of the user in the correct direction of key insertion. When the mechanical key 13 is authorized, the mechanical key 13 is inserted into the latch mechanism 11 to unlock, and when the mechanical key 13 is not authorized, the mechanical key 13 is separated from the latch mechanism 11 and cannot be unlocked.

Further, in a preferred embodiment provided in the present disclosure, the mechanical key 13 can achieve detachable separated limit.

Mechanical key 13 achieves detachable separated limit can be understood as mechanical key 13 is placed in the smart door lock 100 internal, but in use, can be removed from the smart door lock 100 internal, thereby reducing the burden of the user carrying the mechanical key 13.

Figure 3:
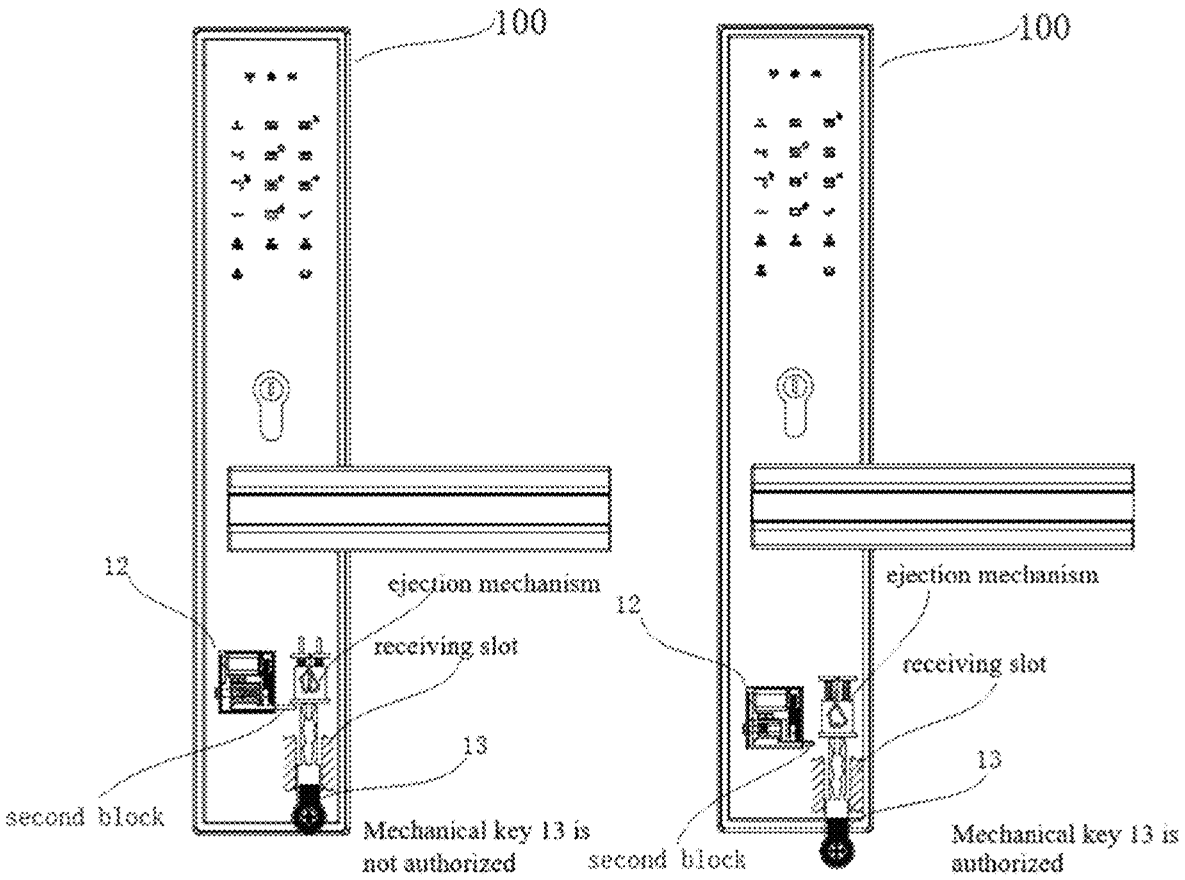
FIG. 3 shows a schematic structural view of a smart door lock according to embodiments of the present disclosure, in which for the left diagram, a mechanical key is not authorized, and for the right diagram, the mechanical key is authorized.
Figure 4:
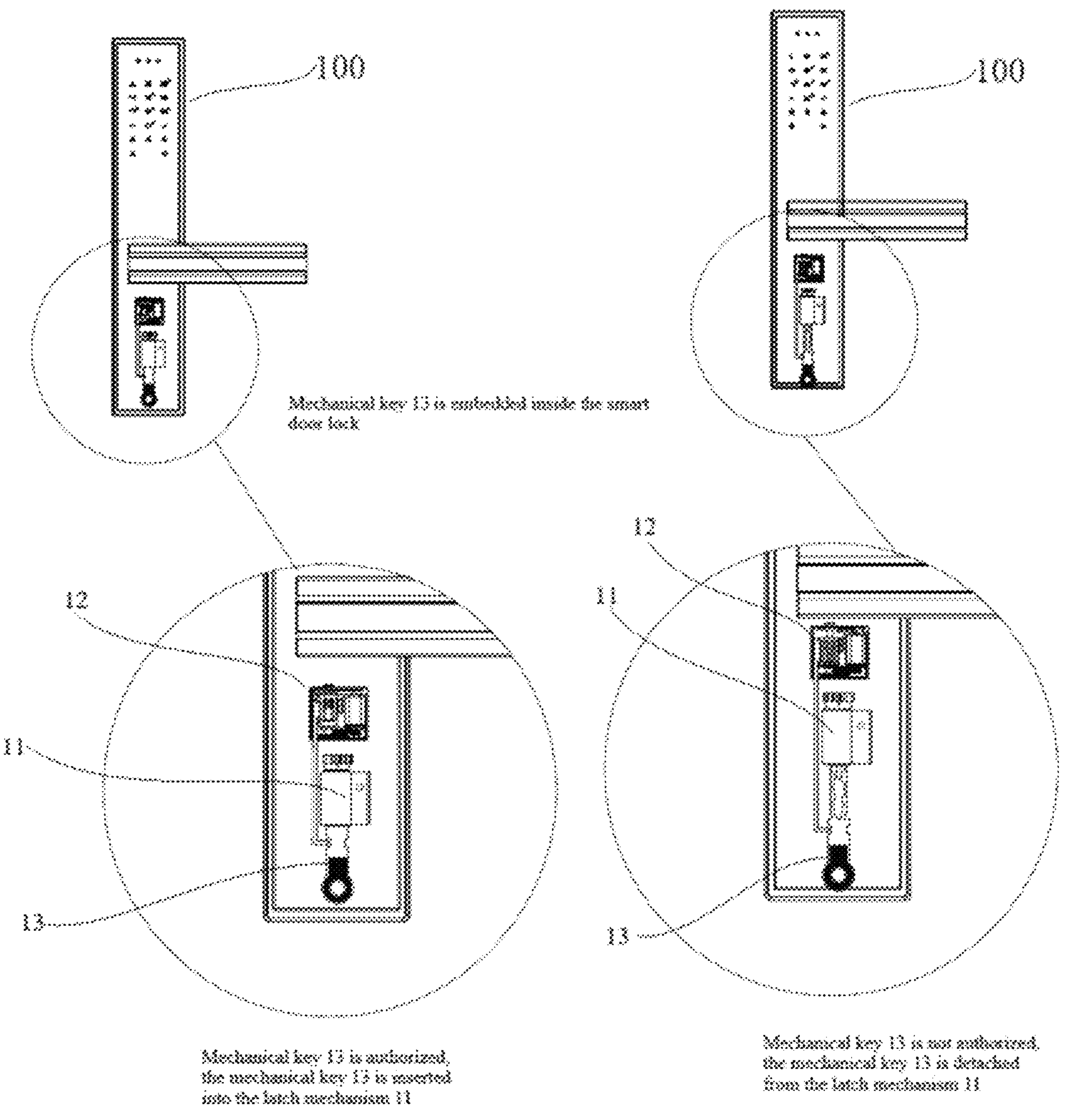
FIG. 4 shows a schematic structural view of a smart door lock according, to embodiments of the present disclosure, in which for the left diagram, a mechanical key is authorized, and for the right diagram, the mechanical key is not authorized.

Further, in a preferred embodiment provided in the present disclosure, the smart door lock 100 is provided with a receiving slot (shown in FIG. 3).

Further, in a preferred embodiment provided in the present disclosure, the mechanical key 13 may slide relative to the receiving slot or the mechanical key 13 may be removed directly from the receiving slot.

It can be understood that the mechanical key 13 is housed in the smart door lock 100 in the receiving slot, with the help of the mechanical key 13 and the friction between the receiving slot to maintain in the receiving slot. The user overcomes the friction of the sink to the mechanical key 13 to remove the mechanical key 13. Alternatively, the user can remove it directly from the receiving slot. After use, the user overcomes the friction of the receiving slot on the mechanical key 13 to push the mechanical key 13 into the receiving slot again. Alternatively, the user can put the mechanical key 13 directly into the receiving slot. In the actual use of the process, although the mechanical key 13 can be removed, but because the mechanical key 13 is not authorized, the mechanical key 13 may be blocked and cannot be fully inserted into the latch mechanism 11, or the mechanical key 13 is prevented from moving, and thus cannot be unlocked.

Further, in a preferred embodiment provided in the present disclosure, the smart door lock 100 is provided with a mechanical key 13 ejection mechanism (shown in FIG. 3).

Further, in a preferred embodiment provided in the present disclosure, the ejection mechanism is a two-stroke motion mechanism, the mechanical key is limited after a first press, the mechanical key is ejected after a second press.

The ejection mechanism is a two-stroke motion mechanism, the mechanical key 13 is limited after a first press, the mechanical key 13 is ejected after a second press.

Smart door lock 100 can be set up mechanical key 13 ejection mechanism. Ejection mechanism for the second stroke movement mechanism, when pressing the mechanical key 13 for the first time, the mechanical key 13 is pushed into the receiving slot and limited therein, when pressing the mechanical key 13 for the second time, the mechanical key 13 passes over the limit structure, and is ejected by the ejection mechanism. According to the embodiments provided in the present disclosure, the ejection mechanism can make the mechanical key 13 easy to remove.

Further, in a preferred embodiment provided in the present disclosure, the mechanical key 13 is provided with a mechanical key 13 receiving box;

The ejection mechanism is connected with the receiving box.

Understandably, the mechanical key 13 is usually relatively flat, the force area is small, not convenient for the mechanical key 13 pop-up. In the implementation mode provided in the present disclosure, the mechanical key 13 is placed in the receiving box, the ejection mechanism abuts with the receiving box, the setting of the receiving box increases the scope of the ejection mechanism, thus facilitating ejection of the mechanical key 13.

Further, in a preferred embodiment provided in the present disclosure, the authorization module 12 has a second block (shown in FIG. 3); the second block is connected with the ejection mechanism; when the mechanical key 13 is authorized, the second blocking withdraws, the second press mechanical key 13 is ejected; when the mechanical key 13 is not authorized, the second blocking device limit prevents the ejection mechanism from ejecting the mechanical key 13.

In order to prevent the mechanical key 13 from being removed by the illegal user, the authorization module 12 is provided with a second block. The second block is connected to the ejection mechanism. When the mechanical key 13 is authorized, the second blocker withdraws and the mechanical key 13 can be ejected after a second press. When the mechanical key 13 is not authorized, the second blocking device limit prevents the ejection mechanism from ejecting the mechanical key 13.

Figure 2:
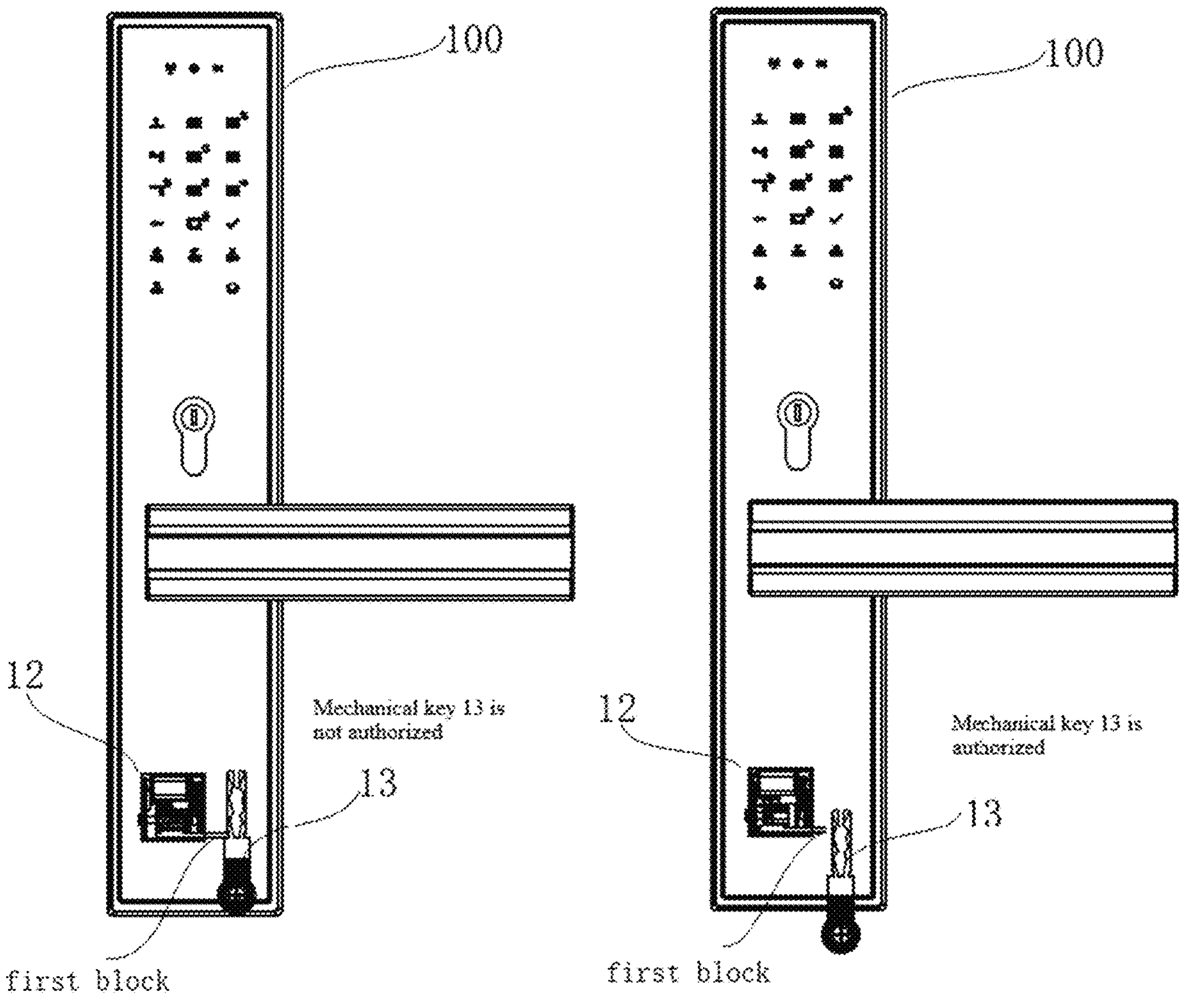
FIG. 2 shows a schematic structural view of a smart door lock according to embodiments of the present disclosure, in which for the left diagram, a mechanical key is not authorized, and for the right diagram, the mechanical key is authorized.

Further, in a preferred embodiment provided in the present disclosure, the authorization module 12 includes the first block (shown in FIG. 2); when the mechanical key 13 is authorized, the first block withdraws, the mechanical key 13 can be operated; when the mechanical key 13 is not authorized, the first block prevents the mechanical key 13 from moving.

The role of the first blocker is to prevent movement of the mechanical key 13 relative to latch mechanism 11. The specific function of the first block can be to prevent the mechanical key 13 insertion, or to prevent the mechanical key 13 rotation. When the mechanical key 13 is authorized, the first block withdraws, the mechanical key 13 can be operated, that is, the mechanical key 13 can be fully inserted into the latch mechanism 11 or the mechanical key 13 can be relative to the latch mechanism 11 rotation. And when the mechanical key 13 is not authorized, the first block prevents movement of the mechanical key 13, prevents the mechanical key 13 from fully inserting the latch mechanism 11, or prevents rotation of the mechanical key 13 relative to the latch mechanism 11 to complete the unlock.

Further, in a preferred embodiment provided in the present disclosure, the authorization module 12 includes moving member; when the mechanical key 13 is authorized, the moving part is out of the limit state of the latch mechanism 11, the mechanical key 13 motion can unlock the latch mechanism 11; when the mechanical key 13 is not authorized, the moving member maintain the limit state of the latch mechanism 11, the mechanical key 13 movement cannot unlock the latch mechanism 11.

The latch mechanism 11 has a two stage lock mechanism. Mechanical key 13 is a first stage locking mechanism and the moving part is second stage locking mechanism. When the mechanical key 13 is authorized, the moving part is out of the limit state of the latch mechanism 11, movement of the mechanical key 13 can unlock the latch mechanism 11. When the mechanical key 13 is not authorized, the moving member maintain the limit state of the latch mechanism 11, movement of the mechanical key 13 cannot unlock the latch mechanism 11. Moving member can have a variety of implementation forms. An implementation form of a moving part can be a coupling (shaft connecting device). When the mechanical key 13 is authorized, the moving member are connected to two separate shafts, and the latch mechanism 11 can be unlocked. When the mechanical key 13 is not authorized, because the moving part does not connect the two shafts, a section of the shaft corresponding to the mechanical key 13 idly rotates which cannot drive the two shafts at the same time motion, and then the latch mechanism 11 cannot be unlocked. The moving member can also be per a week limit piece. When the mechanical key 13 is not authorized, due to the limit of the moving member, the mechanical key 13 can only be turned in the first stroke which cannot complete the entire unlocking travel of the latch mechanism 11. When the mechanical key 13 is authorized, the moving part is out of the limit state, and the mechanical key 13 can be rotated within the full travel so that the latch mechanism 11 is unlocked.

Here's a specific scenario for the smart door lock 100 provided in the present disclosure: Smart door lock 100 can be unlocked by a variety of electronic manners, such as biometric identification, input passwords and so on. When the control signal processing fails, or when battery power of the smart door lock 100 is not enough to unlock. Users can only complete the authorization of mechanical key 13 by entering passwords, biometric matching, electronic labeling, communication authentication, etc. It is appreciated that, the mechanical key 13 can be embedded inside the smart door lock 100, can also be separated limit located in the smart door lock 100. For the mechanical key 13 embedded in the smart door lock 100 internal, when the mechanical key 13 is authorized, the mechanical key 13 is inserted into the latch mechanism 11 to complete unlock, used to open the smart door lock 100 by applying force. When the mechanical key 13 separation limit is located in the smart door lock 100, when the mechanical key 13 is not authorized, the mechanical key 13 cannot be removed, or the mechanical key 13 cannot be fully inserted into the latch mechanism 11, or the mechanical key 13 cannot move relative to the latch mechanism 11*t*, or movement of the mechanical key 13 relative to the latch mechanism 11 cannot complete the entire unlocking trip, or the mechanical key 13 cannot be unlocked alone. When the mechanical key 13 is authorized, the mechanical key 13 can successfully complete the unlocking of the latch mechanism 11.

The present disclosure also provides a smart door lock 100 that includes: latch mechanism 11, for door locking and unlocking; mechanical key 13, for inserting into the latch mechanism 11 for unlocking; receiving slot for receiving the mechanical key 13.

In a typical configuration, computing devices include one or more processors (CPUs), input/output interfaces, network interfaces, and memory.

Memory may include non-transitory memory in computer readable media, random access memory (RAM) and/or non-volatile memory, such as read-only memory (ROM) or flash RAM. Memory is an example of computer-readable media.

Computer-readable media, including transitory and non-transitory, removable, and non-removable media, can be stored by any method or technology. Information can be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (DRAM), EEPROM, flash memory or other memory technologies, CD-ROMs, digital multifunction optical discs (DVDs), or other optical storage, magnetic cartridges, tape magnetic disk storage or other magnetic storage devices, or any other non-transmission media, can be used to store information that can be accessed by computing devices. As defined in this article, computer-readable media does not include staging computer-readable media, such as modulation of data signals and carriers.

It should also be noted that the term “including”, “comprising” or any other variant of it is intended to cover non-exclusive inclusion, so that a process, method, product or equipment that includes a series of elements includes not only those elements, but also other elements that are not explicitly listed, or that are inherent in such processes, methods, product s or equipment. In the absence of additional restrictions, a feature qualified by the statement “including a . . . ” does not exclude the fact that there are additional identical elements in the process, method, product or equipment that includes the feature.

Skilled personnel in the technology should understand that the present disclosure for the implementation of the case can be provided as a method, system or computer program products. Therefore, the present disclosure may take the form of a full hardware implementation, a full software implementation, or a combination of software and hardware implementations. Furthermore, the present disclosure may take the form of a computer program product implemented on one or more computer-available storage media (including, but not limited to, disk memory, CD-ROM, optical memory, etc.) that contain codes available to the computer.

The above is only an example of the implementation of the present disclosure and is not intended to limit the present disclosure. For skilled personnel in the technology, the present disclosure may have a variety of changes and modifications. Any modifications, equivalent replacements, improvements, etc. made within the spirit and principles of the present disclosure shall be included in the scope of the claims in the present disclosure.

What is claimed is:

1. A smart door lock, comprising:

latch mechanism for locking and unlocking doors;

authorization module for authorizing or de-authorizing authority of mechanical key for opening the latch mechanism; and the mechanical key for inserting into the latch mechanism for unlocking after being authorized by the authorization module, wherein:

the authorization module includes a first block;

when the mechanical key is authorized, the first block withdraws, so that the mechanical key is operable; and when the mechanical key is not authorized, the first block prevents the mechanical key from moving; and the first block preventing the mechanical key from moving comprising:

the first block preventing the mechanical key insertion, or preventing the mechanical key rotation.

2. The smart door lock of claim 1, wherein:

an authorization mode of the authorization module to includes at least one of:

entering password;

biometric matching;

electronic labels;

communications certification; or command action.

3. A smart door lock, comprising:

latch mechanism for locking and unlocking doors;

authorization module for authorizing or de-authorizing authority of mechanical key for opening the latch mechanism; and the mechanical key for inserting into the latch mechanism for unlocking after being authorized by the authorization module, wherein:

the mechanical key achieves detachable limit, that is, the mechanical key is placed in smart door lock internal, but in use, can be removed from the smart door lock internal;

the smart door lock is provided with a mechanical key ejection mechanism; and the authorization module includes a second block;

the second block abuts against the ejection mechanism;

when the mechanical key is authorized, the second block withdraws, and the mechanical key is ejected after a second press; and when the mechanical key is not authorized, the second block prevents the ejection mechanism from ejecting the mechanical key.

4. The smart door lock of claim 3, wherein:

the smart door lock includes a receiving slot.

5. The smart door lock of claim 3, wherein:

the ejection mechanism includes two-stroke motion, the mechanical key is limited after a first press, and the mechanical key is ejected after a second press.

6. The smart door lock of claim 3, wherein:

the mechanical key is provided with a mechanical key receiving box; and the ejection mechanism abuts against the receiving box.

7. The smart door lock of claim 4, wherein:

the mechanical key is slidable relative to the receiving slot or the mechanical key is directly removable from the receiving slot.

8. A smart door lock, comprising:

latch mechanism for locking and unlocking doors;

authorization module for authorizing or de-authorizing authority of mechanical key for opening the latch mechanism; and the mechanical key for inserting into the latch mechanism for unlocking after being authorized by the authorization module, wherein:

the mechanical key is embedded in the smart door lock;

when the mechanical key is authorized, the mechanical key is inserted into the latch mechanism; and when the mechanical key is not authorized, the mechanical key is detached from the latch mechanism.

* * * * *